No. 635,885. Patented Oct. 31, 1899.
F. L. WATSON.
PIPE HANGER.
(Application filed June 24, 1899.)
(No Model.)
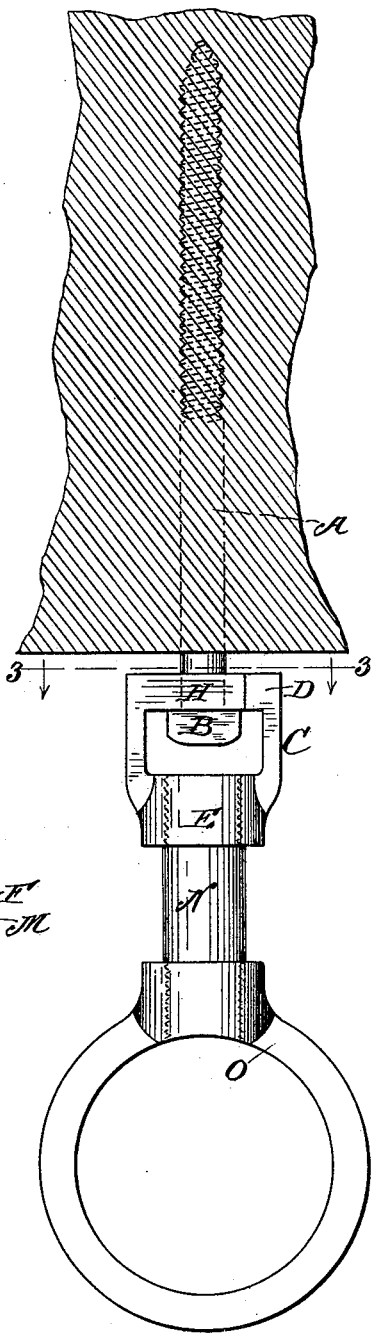
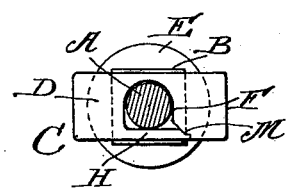
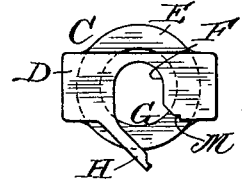
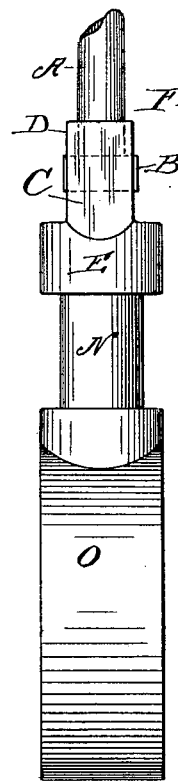
Witnesses:
Inventor:
Frank L. Watson
per
James M. Proudfit
Attorney

UNITED STATES PATENT OFFICE.

FRANK L. WATSON, OF CHICAGO, ILLINOIS.

PIPE-HANGER.

SPECIFICATION forming part of Letters Patent No. 635,885, dated October 31, 1899.

Application filed June 24, 1899. Serial No. 721,725. (No model.)

*To all whom it may concern:*

Be it known that I, FRANK L. WATSON, a citizen of the United States, residing in Chicago, in the county of Cook and State of Illinois, have invented a new and useful Improvement in Pipe-Hangers, of which the following is a specification.

My invention relates to an improvement in the method of hanging pipes from ceilings, joists, and other surfaces.

The object of my invention is to furnish a hanger that will be inexpensive, that may be easily and quickly attached to the supporting-surface, and that admits of the pipe being adjusted or removed without detaching the hanger from the supporting-surface. I attain these objects by the mechanism illustrated in the accompanying drawings, in which—

Figure 1 is a side view of the entire pipe-hanger. Fig. 2 is an edge view of the same. Fig. 3 is a cross-section of part of the hanger on the line 3 3 in Fig. 1. Fig. 4 is a top view or plan of the part shown in Fig. 3, hereinafter called a "swivel."

In the following details I refer to the drawings, in which similar letters refer to similar parts throughout the several views.

A screw A, having a square flat head B, is inserted perpendicularly in the ceiling or other supporting-surface, leaving a space between B and the supporting-surface for attaching the swivel C, as hereinafter shown.

The swivel C consists of a square link D, modified at its lower rim to a hollow cylinder E. In the center of the upper rim of the link D is a circular orifice F, broken on one side by a lateral aperture G, which may be opened and closed at will by a tongue H, extending from one side of G.

After the screw A is in place the swivel C, which may be made of any malleable metal, is attached to it by passing A through the aperture G into the orifice F, where it is secured by hammering the tongue H against the surface M at the side of the aperture, which is slightly inclined and notched to secure a smooth connection. In this position C operates as a swivel, being supported at its upper rim by the head of the screw B, which rests within the link D.

An arm N is screwed into the bottom of the cylinder E. A ring O, which contains the pipe, is screwed into the lower extremity of N. Through its connection with the swivel C the arm N may be unscrewed from the cylinder E or the ring O may be unscrewed from the arm N without removing the pipe from the ring. The distance of the pipe from the ceiling may be regulated by the arm N, which may be of any length required.

The head of the screw B is approximately of the same width as the link D, (see Fig. 2,) so that B may be grasped by a wrench and the screw A turned without detaching the swivel C, affording a convenient method of raising and lowering the pipe short distances in adjusting it for connections, &c.

What I claim as my invention, and desire to secure by Letters Patent of the United States, is—

1. In a pipe-hanger, a swivel in the form of a square link modified at its lower rim to a hollow cylinder interiorly threaded, having an orifice in the center of its upper rim, broken on one side by a lateral opening, with a flexible tongue extending from one side of the lateral opening, in combination with a screw having a square flat head of approximately the same width as the sides of the swivel, whereby the swivel is attached to and supported by the screw, in the manner and for the purpose substantially as shown above.

2. A swivel in the form of a square link modified at its lower rim to a hollow cylinder interiorly threaded having an orifice in the center of its upper rim, broken on one side by a lateral opening, with a flexible tongue extending from one side thereof, in combination with a drop-arm, threaded at both ends, screwed into the cylindrical portion of said swivel and at its lower extremity attached to a ring, which carries the pipe, substantially in the manner and for the purpose shown above.

FRANK L. WATSON.

Witnesses:
CHARLES LOUGHRIDGE,
LEONARD BLIX.